(No Model.) 2 Sheets—Sheet 1.

W. R. MORTIMER.
CARRIAGE BRAKE.

No. 258,793. Patented May 30, 1882.

WITNESSES:
Francis McArdle
C. Sedgwick

INVENTOR:
W. R. Mortimer
BY Munn & Co
ATTORNEYS.

(No Model.) 2 Sheets—Sheet 2.

W. R. MORTIMER.
CARRIAGE BRAKE.

No. 258,793. Patented May 30, 1882.

WITNESSES:
Francis McArdle.
C. Sedgwick.

INVENTOR:
W. R. Mortimer
BY Munn & Co.
ATTORNEYS.

UNITED STATES PATENT OFFICE.

WALTER RUSSELL MORTIMER, OF ROGATE LODGE, ROGATE, COUNTY OF SUSSEX, ENGLAND.

CARRIAGE-BRAKE.

SPECIFICATION forming part of Letters Patent No. 258,793, dated May 30, 1882.

Application filed March 24, 1882. (No model.) Patented in England July 26, 1881, No. 3,279, and in France January 20, 1882, No. 134,967.

*To all whom it may concern:*

Be it known that I, WALTER RUSSELL MORTIMER, of Rogate Lodge, Rogate, in the county of Sussex, England, have invented certain new and useful Improvements in Brakes for Carriages, Bicycles, and other Wheeled Vehicles and Cranes, of which the following is a full, clear, and exact description.

My invention relates to brakes for carriages, bicycles, and other wheeled vehicles and cranes; and has for its object to construct and arrange such brakes in a single, compact, and not unsightly manner, with their working-parts protected, as hereinafter more fully described.

Reference is to be had to the accompanying drawings, forming part of this specification, in which similar letters of reference indicate corresponding parts in all the figures.

Figure 1:
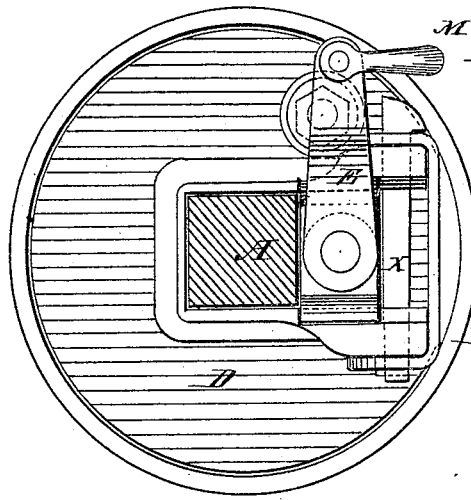
Figure 2:
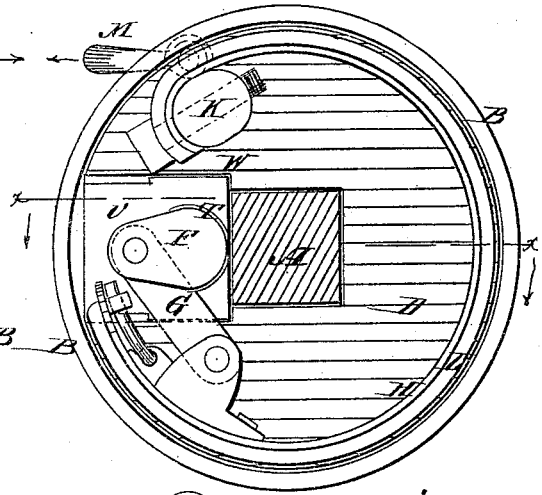
Figure 3:
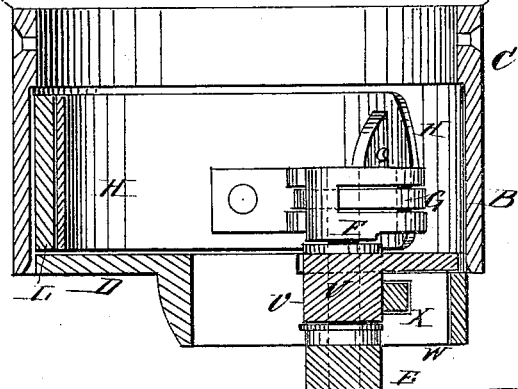
Figure 4:
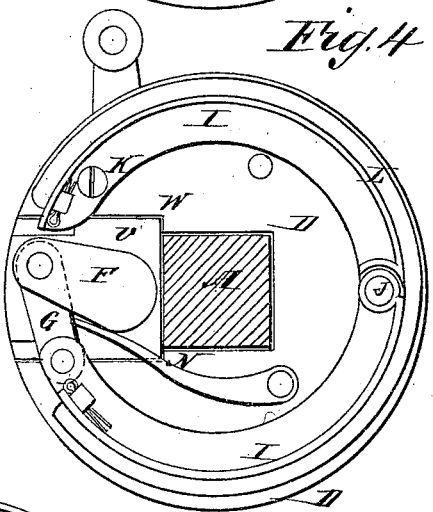
Figure 5:
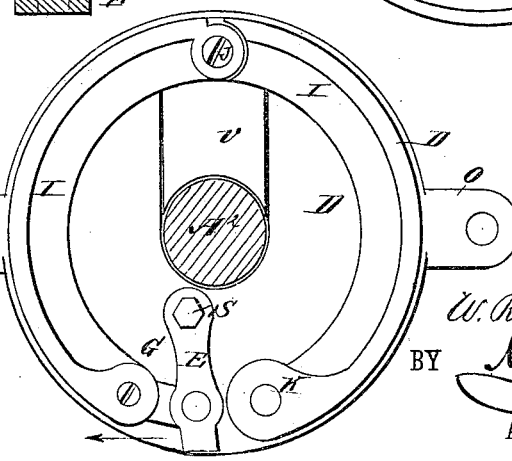
Figure 6:
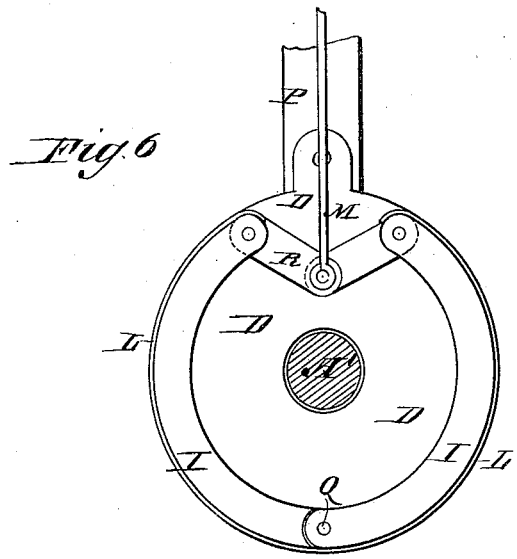
Figure 7:
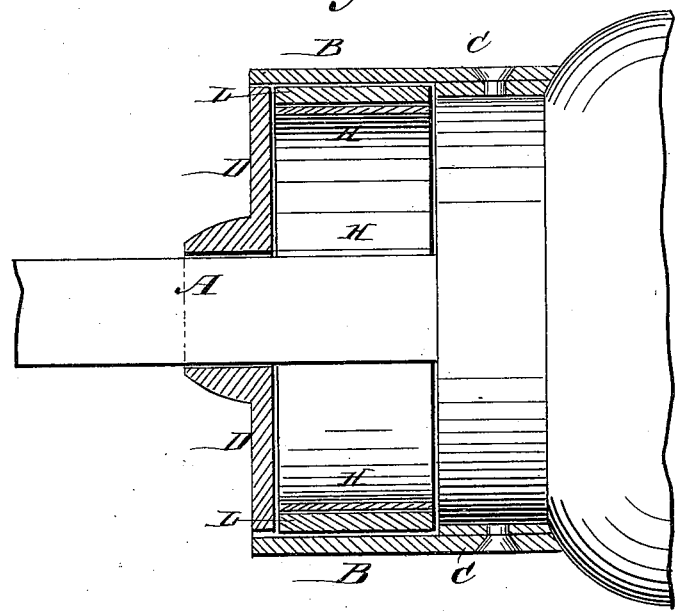

Figure 1 is a cross-section of the axle of a vehicle and side elevation of the improved brake as seen from between the wheels of the vehicle. Fig. 2 is a cross-section of the axle between the wheel and brake and elevation of the side of the brake in reverse of Fig. 1. Fig. 3 is a horizontal section of Fig. 2 on line $x\ x$. Fig. 4 is an elevation of the disk and brake devices in the same view as Fig. 2, with a modified construction of the friction device of the brake; and Fig. 5 is an elevation in the same view as Fig. 4, with a modified arrangement of the brake-lever, and also a modification adapting the brake for application to a crane or other machine having a revolving shaft that carries the ring, band, or other device on which the brake is to act. Fig. 6 is an elevation, showing the application of the brake to a bicycle; and Fig. 7 is a section of the brake and the nave of a vehicle-wheel in the line of the axle.

In constructing a brake for a wheel—such as that of a carriage or vehicle having a stationary axle, A, on which the wheel revolves—I extend inward at B, toward the carriage, the ring C, which is usually shrunk on the nave of the wheel; or I fix over it another ring projecting toward the carriage in the same manner, and behind this extension B, I fix on the axle a disk, D, which may be constructed with a lip projecting forward so as to overlap the ring fixed, as here represented, on a disk, the outer edge of which is overlapped by but free from the ring, as shown best in Fig. 3. On this disk I mount a lever, E, one arm of which, F, is jointed by link G, or other suitable means, to one end of a divided spring-ring, H, or two semicircular segments, I, hinged together at J, the other end of which ring or segments is jointed to the disk D at K. This spring-ring or these segments are covered over the outer surface with leather L or other suitable material, and the ring thus covered is of such a diameter that it lies just within the ring B, fixed on the nave, but without touching its inner surface, so that the wheel can revolve freely without friction. To the other arm of lever E is attached a cord, chain, or rod, M, connected to a handle, lever, screw, or treadle at any convenient part of the vehicle. On pulling the cord, chain, or rod the lever is moved so as to expand the spring-ring H or segments I, and so press the leather or other covering against the ring B fixed on the nave, producing friction, which retards or arrests the rotation of the wheel. If segments are used, on slackening the cord, chain, or rod they are drawn inward by a spring, N, thus releasing the brake.

For the brake of a bicycle-wheel, which revolves along with its axle, I attach to one side of the wheel a nave-ring, B C, and on one limb, P, of the fork which carries the crank-axle A', I fix the disk D, and preferably with its lip overlapping the nave-ring. On a pin, Q, on this disk I joint the lower ends of the semicircular segments I, which are covered with leather L, or other suitable material, and I connect the upper ends of these segments to a toggle-joint, R, the middle pin of which is connected by a rod or cord, M, to a handle. On pulling up this rod or cord, so as to straighten the toggle, the two semicircular segments jointed to it are forced outward from the center of the wheels, and their leather or other covering is thus pressed against the inner surface of the nave-ring, producing friction, which retards or arrests the rotation of the wheel. On slackening the rod or cord the semicircular segments are drawn inward by a spring, thus releasing the brake. A similar construction of brake is applicable to the wheels of a tricycle, the semicircular segments and toggle being arranged so that the rod or cord which works them can be led to a position convenient for the hand or foot of the operator.

For the brake of a crane, the drum of which revolves with its axle $A^2$, Fig. 5, the only difference between the application of my invention to a carriage and such crane is, that in the case of the crane the disk D, on which the working parts of the brake are mounted, is attached to the framing of the crane—say, by brackets O—and a space is left in the center of the disk to allow of the free revolution of the shafting $A^2$ or axle of the drum, and the divided spring H, ring or segments I are placed in the inside of the drum of the crane, or, if that be solid, inside of a ring fixed thereon, so as to act on the inside of the drum or ring upon the pulling or thrusting of the lever E, in like manner as they act on the ring fixed on the nave of the wheel of an ordinary carriage. In this case the lever E will be connected to the disk by a fixed pivot, S, and will extend directly outward therefrom, instead of the oscillating pivot T extending through the disk, as in the application to a vehicle-wheel. When the pivot T so extends through the disk a bearing-block, U, to carry the pivot, is fitted in a slot, W, of the disk and secured by a key, X, or other device. The slot W may be the same by which the disk is applied to the axle. When the disk is applied to the shaft $A^2$ of a drum by means of a slot, W, in the disk said slot will be fitted with a block, U, as when the disk is applied to the axle of a vehicle in the same manner.

Having thus fully described my invention, I claim as new and desire to secure by Letters Patent—

1. The combination, with a ring secured to the nave of a wheel or to a drum and a ring secured to an axle or other fixed support, of a divided expanding ring or segments of a ring secured to the said disk, and a lever connected to the expanding ring or segments for expanding the same, substantially as and for the purpose set forth.

2. The combination, with the ring B, and the disk D, of the ring H I, secured to the said disk, the lever E, provided with the arm F, and the connecting-link G, substantially as and for the purpose set forth.

3. The combination of disk D, ring H I, lever E F, bearing U, and the ring B of a wheel or drum, substantially as specified.

4. The combination of disk D, ring H I, lever E F, spring N, and the ring B of a wheel or drum, substantially as specified.

The foregoing specification of my improvement in brakes for wheels signed by me this 28th day of February, 1882.

WALTER RUSSELL MORTIMER.

Witnesses:
W. I. WEEKS,
H. J. FULLER,
    *Both of* 31 *Lombard Street.*